UNITED STATES PATENT OFFICE.

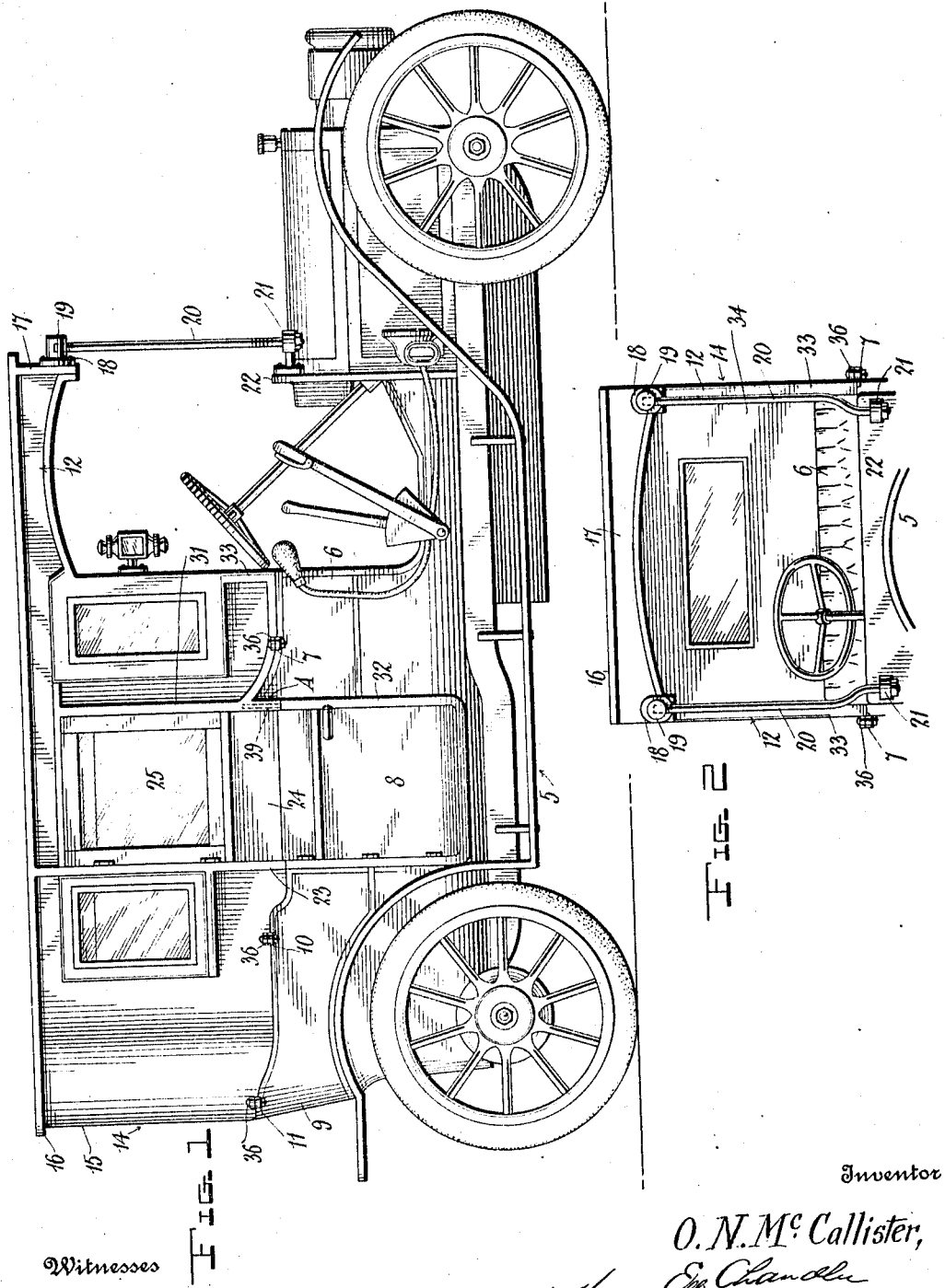

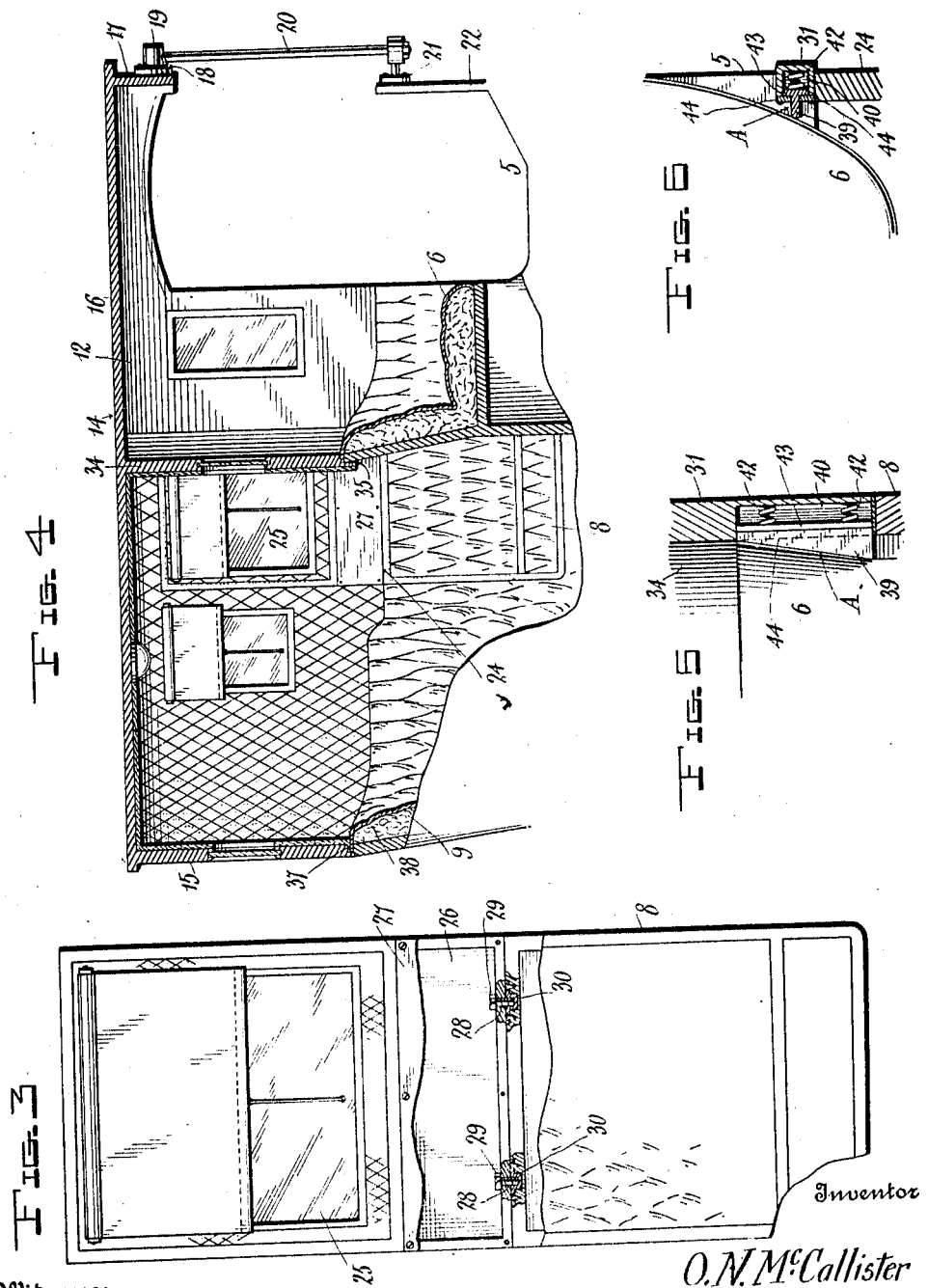

OSCAR N. McCALLISTER, OF MOUNT VERNON, INDIANA.

DETACHABLE LIMOUSINE-TOP FOR AUTOMOBILES.

1,026,358.  Specification of Letters Patent.  Patented May 14, 1912.

Application filed June 20, 1911. Serial No. 634,331.

*To all whom it may concern:*

Be it known that I, OSCAR N. McCALLISTER, a citizen of the United States, residing at Mount Vernon, in the county of Posey and State of Indiana, have invented certain new and useful Improvements in Detachable Limousine-Tops for Automobiles, of which the following is a specification.

This invention relates to automobiles, and more particularly to automobile tops, and has for its object to provide a top of the limousine type, which will be such that it may be easily attached or detached and which will be so constructed and arranged that when in position, it will be rigidly held in place and thus be free from vibration when the machine is passing over the road.

Another object is to provide a top which may be attached by means of the usual top irons of the car, and which will include a means for connecting the upper door sections with the regular doors of the car.

In the drawings forming a portion of this specification, and in which like numerals of reference indicate similar parts in the several views,—Figure 1 is a side elevation of a touring car with the present top in place; Fig. 2 is a front elevation showing the supporting rods engaged with the lamp brackets; Fig. 3 is an interior view of one of the doors partly in section showing the attachment of the upper and lower portions; Fig. 4 is a central longitudinal section through Fig. 1, showing the connection of the partition with the front seat; Fig. 5 is a detail view showing the arrangement of the filling plate; Fig. 6 is a detail view, partly in section, looking downwardly on Fig. 5.

Referring now to the drawings, there is shown an automobile 5, having a front seat 6 provided with top irons 7, and having also a pair of hinged doors 8, the machine including as well a tonneau seat 9, having top-irons 10 and 11.

The limousine top is shown at 14, and includes sides 12, and a back 15. The top 16 has at its forward end a depending portion 17, to the outer ends of which there are attached blocks 18, to which there are secured threaded sockets 19, which receive rods 20 off-set at their lower ends for engagement in the lamp brackets 21, which are attached to the dash-board 22 of the car. The sides 12 are of such a length as to extend to the rearward edges of the doors 8 where they have uprights 23 to which there are hinged the upper door sections 24. These door sections include upper glass panels 25, and below these glass panels the thickness of the door contains a chamber 26 covered on the inner side of the door by a removable panel 27. Formed through the bottom of this chamber there are passages 28 which receive attaching screws 29, these screws engaging into threaded blocks 30 secured to the upper edges of the doors 8 of the car.

It will of course be understood that when the limousine top is not in use the upper edges of the doors 8 are covered by the usual strips employed for this purpose.

Forwardly of the door sections 24, the top has an upright 31 which extends down and engages upon the hinge block 32 of the corresponding door 8.

By reason of the curvature of the front seat, forwardly of the uprights 31, the top includes side portions 33 which lie at the sides of the front seat, and extending between the two uprights 31 there is a transverse partition 34 which fits upon the back of the front seat and which has a flange 35 extending down over the rearward face of the back.

The top is provided with a plurality of irons 36 which engage in the top-irons 7, 10 and 11 of the body and hold the top in position. The inside of the top is suitably upholstered and the lower edges of the upholstery are left free, as indicated at 37, and are turned in under the lower edges of the sides and back and against the cushions 38 of the car itself.

By reason of the curvature of the front seat 6 of the car, adjacent to the downwardly extending portion of the uprights 31, at the point indicated at A, there would normally be a space for which a filler plate 39 is provided. This filler plate 39 has its outer edge engaged in a slot 40 formed in the lower portion of the corresponding upright 31, and is held normally projected inwardly by springs 42. It is thus held yieldably against the curved portion of the seat 6. It is held against complete disengagement from the slot by a flange plate 43 formed upon its outer edge and lying within the slot, at the edges of which there are flanges 44.

From the foregoing it will be seen that there is provided a top which may be easily and quickly attached and which by reason of the peculiar manner of fastening forms what is in effect an integral part of the car, and is thus free from vibration or shaking. This is due to a large extent to the flange 35 of the partition 34, which extending behind the back of the front seat effectually prevents all tendency toward forward movement of the top incident to slowing down or stopping the car.

I claim:

1. The combination with an automobile of a removable top section therefor, said top section having portions extending downwardly over the curved surfaces of the automobile in spaced relation thereto, said downwardly extending portions having slots therein, filler plates slidably engaged in the slots and means for holding the filler plates yieldably extended and in engagement with the curved surfaces of the automobile.

2. The combination with an automobile, having hinge blocks terminating short of the upper edge of the front seat, of a limousine top having uprights extending down and resting upon the upper ends of the hinge blocks, and adjustable filler members carried by the uprights and extending between the uprights and the surface of the front seat.

In testimony whereof I affix my signature, in the presence of two witnesses.

OSCAR N. McCALLISTER.

Witnesses:
 HARRY C. McKAY,
 CLEM. V. SCHENK.

Copies of this patent may be obtained for five cents each, by addressing the "Commissioner of Patents, Washington, D. C."